United States Patent [19]

Duvdevani et al.

[11] Patent Number: 4,599,377

[45] Date of Patent: Jul. 8, 1986

[54] ACID BASE INTERACTING POLYMER SOLUTIONS

[75] Inventors: Ilan Duvdevani, Leonia; Donald N. Schulz, Annandale, both of N.J.; Kissho Kitano, Ohi, Japan; Dennis G. Peiffer, E. Brunswick, N.J.

[73] Assignee: Exxon Research and Engineering Co., Florham Park, N.J.

[21] Appl. No.: 756,834

[22] Filed: Jul. 19, 1985

Related U.S. Application Data

[63] Continuation-in-part of Ser. No. 625,975, Jun. 29, 1984, abandoned, which is a continuation-in-part of Ser. No. 566,349, Dec. 28, 1983, abandoned.

[51] Int. Cl.$^4$ ............................................. C08L 39/00
[52] U.S. Cl. .................................... 524/516; 524/515; 524/521; 524/522
[58] Field of Search ................ 524/515, 516, 521, 522

*Primary Examiner*—Joseph L. Schofer
*Assistant Examiner*—J. M. Reddick

*Attorney, Agent, or Firm*—Richard E. Nanfeldt

[57] ABSTRACT

The present invention relates to a process for the viscosification of an organic liquid which comprises the steps of forming a first solution of a polymer containing carboxylic acid side groups dissolved in the organic liquid; forming a second solution of a basic polymer in the organic liquid and mixing the first and the second solutions together to form an interpolymer complex of the acid containing and basic polymers in the organic liquid, wherein the organic liquid containing the interpolymer complex has improved viscosification properties. This solution possesses higher viscosity than the mean of the separate viscosities of the starting solutions at relatively low solids content. Moreover, these interpolymer complexes, in hydrocarbon solutions, can be formulated to exhibit shear thickening at increased shear rates. This property is useful in such technological applications as antimisting of the solvent. Furthermore, the present invention discloses a process wherein viscosification and shear thickening can be reversed.

15 Claims, No Drawings

ACID BASE INTERACTING POLYMER SOLUTIONS

CROSS-REFERENCE TO RELATED APPLICATIONS

This application is a continuation-in-part of U.S. Ser. No. 625,975, filed June 29, 1984, now abandoned, which is a continuation-in-part of U.S. Ser. No. 566,349, filed Dec. 28, 1983, now abandoned.

FIELD OF THE INVENTION

The present invention relates to a process for the viscosification of an organic liquid which comprises the steps of forming a first solution of a polymer containing carboxylic acid groups in the organic liquid; forming a second solution of a polymer containing a base in the organic liquid; and mixing the first and the second solutions together to form an interpolymer complex of the acid containing and base containing polymers in the organic liquid, wherein the organic liquid containing the interpolymer complex has improved viscosification properties. This solution possesses higher viscosity than the mean of the separate viscosities of the starting solutions at relatively low solids content. Moreover, these interpolymer complexes, in hydrocarbon solutions, can be formulated to exhibit shear thickening rheology at increased shear rates, which is useful for antimisting properties of the solution. Furthermore, the present invention also discloses a process wherein viscosification and shear thickening can be reduced.

DESCRIPTION OF THE PRIOR ART

In recent years, interpolymer complexes have received considerable attention in the literature due to their interesting and unique properties and their similarity to certain biological systems (e.g. E. Tsuchida, K. Abe, Advances in Polymer Science, Vol. 45, 1982). In most instances, these complexes are formed by intimately mixing aqueous solutions containing high-charge density polyelectrolytes possessing opposite charge. When these polymer molecules meet in solution, the interaction between oppositely charged sites will cause the release of their associated counterions forming the complex. The counterions are now free to diffuse into the bulk solution. Normally, phase separation occurs upon prolonged standing. These high-charge density complexes are not readily formed in organic solvents due to the insolubility of the individual components. Therefore, little work has detailed the solution properties of these systems. To the inventors' knowledge, few studies have focused on the viscosification aspects of high or low-charge density complexes in organic diluents. In these studies, viscosity is used only as a tool to study the development and mechanism of complex formation.

Interpolymer acid-base complexes of the carboxyl and amine type are taught in U.S. Pat. No. 4,002,436. However, the polymers used therein are generally limited to polymers of the free radical addition type.

There are many applications for thickened or gelled solutions of polymers in organic liquids which are quite diverse. There is also a number of physical and chemical techniques for preparing such systems. The present invention is concerned with a process for creating a liquid which increases in viscosity with increasing shear rate. The potential applications for this process and the products derived therefrom will be evident in the instant application. Some of these applications are as a viscosifier and shear thickening additive for organic liquids or solutions, or for gelling an organic liquid.

Shear thickening fluids are rare and have mostly been demonstrated in suspensions (W. H. Bauer and E. A. Collins in "Rheology", Vol. 4, edited by F. R. Eirich, page 459, Academic Press, 1967). Polymer solutions and melts are known, on the other hand, to exhibit strong shear thinning behavior while most liquids of lower molecular weight are Newtonian.

A polymer which was introduced by ICI (FM-9) as an antimisting agent for jet fuel was shown to be "progressively shear thickening." Work done by S. T. J. Peng and R. F. Landel, J. Appl. Phys. 52, 5988 (1981), at Jet Propulsion Laboratories under an FAA contract for antimisting in jet fuels showed that subjecting a solution of FM-9 in jet fuel at about 0.3 to 1.0 weight percent polymer to steady shearing will produce viscous growth with time. It was found that the time scale and the extent of thickening can be accelerated by either increasing the concentration or by increasing the shear rate. The composition of FM-9 is not disclosed by ICI or by other agents working with this polymer. Peng and Landel correlate antimisting behavior with shear thickening or with high elongational viscosity in "Rheology", Vol. 2, edited by G. Astarita, page 385, Plenum Press, 1980.

This invention teaches the enhancement of the viscosity of hydrocarbon solutions with shear rate by preparing polymers which are capable of building large networks. A way for achieving such networks is the complexation of two dissolved polymers, one having low levels of carboxylic acid groups along its backbone and the other having low levels of basic groups along its backbone. The complex can be achieved by dissolving each polymer alone in the solvent and combining the two solutions. Alternately, each polymer can be codissolved in the same solution system. When polymer molecules of opposite acidity and basicity meet in solution, a neutralization reaction occurs forming a complex of positively and negatively charged species.

In order to avoid phase separation of the complex in solution, the charge density along the polymer backbones should be relatively low. The resulting solution of such a complex is then significantly more viscous than solutions containing the individual polymers, provided that the total numbers of negative and positive charges are correctly balanced. Upon addition of a strongly polar agent such as an alcohol, the complex can be disturbed and the viscosity reduced.

This invention further teaches that, for a given balance of the various parameters that may be varied in an interpolymer complex solution, an unexpected shear thickening behavior (Dilatant or Rheopectic Behavior) may be obtained. These parameters include:

Backbone nature of each of the polymers (or copolymers).

The functionality densities along the polymer backbones.

The molecular weight of each polymer.

The ratio between the polymers introduced into solution.

The solvent (and cosolvent, if any).

The concentration of polymer in solution.

We report the finding that low-charge density interpolymer complexes (styrene-co-4-vinyl pyridine: copolymer of an alpha-olefin and a vinyl alkylene carboxylic acid) are useful in viscosifying relatively nonpolar solutions (as required in a variety of well control and work-over fluids, various pharmaceutical applications, oil additive and a host of other systems containing a hydrocarbon-based solvent). These complexes are soluble in a nonpolar solution, but more importantly, possess a substantially higher viscosity than the corresponding individual low-charge density copolymer components. As detailed earlier, these results are unexpected since the general tendency of interpolymer complexes is to be rather insoluble in this environment. As a result these latter materials, prior to the findings of this specification, have poor viscosification properties and thickening efficiency.

Most solutions of high molecular weight polymers are expected to exhibit a shear thinning behavior. This is due to the destruction of an entangled network or a reduced interference between the polymer molecules after orientation at high shear rates. We find that these soluble interpolymer complexes, under narrow conditions, seem on the other hand to possess an ability to establish even larger networks or act as if networks are larger under high shear rates. The exact nature of the interactions under shear as compared to those under rest are not yet understood and cannot, therefore, be predicted. In some cases, interpolymer complexes may show a conventional shear thinning behavior, in other cases they may be shear thickening with a relatively quick response to shear rate change (dilatant behaviour), or they may be "progressively shear thickening" with time under shear (rheopectic or anti-thixotropic behavior).

SUMMARY OF THE INVENTION

The present invention relates to a process for the viscosification of an organic hydrocarbon liquid having a viscosity typically, but not necessarily less than about 10 cps. at 100° F. which includes the steps of forming a first solution of a polymer containing carboxylic acid groups in the organic hydrocarbon liquid; forming a second solution of a basic polymer in the organic hydrocarbon liquid and mixing the first and second solutions to form a solution of the organic hydrocarbon liquid and an interpolymer complex of the two polymers, wherein the resultant solution of the organic hydrocarbon liquid has a viscosity of at least about 10 cps at 100° F. and furthermore exhibits a further increase in viscosity as shear rate increases.

Accordingly, it is a primary object of the instant invention to describe an economical process for forming a highly viscous organic hydrocarbon solution containing a soluble interpolymer complex having a viscosity greater than the mean of the two individual polymer components, typically at least 10 cps.

A further object of the instant invention is to provide a process for forming a homogeneous solution which can be used as a viscosifier for hydrocarbon systems, said fluid displaying shear thickening behavior.

A still further object of the instant invention is to provide a process for reversing visosification and shear thickening of said hydrocarbon solutions.

GENERAL DESCRIPTION

The present invention relates to a process for the viscosification of an organic hydrocarbon liquid having a viscosity typically, but not necessarily less than about 10 cps. which includes the steps of forming a first solution of a polymer containing carboxylic acid groups in the organic hydrocarbon liquid; forming a second solution of a cationic polymer in the organic hydrocarbon liquid and mixing the first and second solutions to form a solution of the organic hydrocarbon liquid and an interpolymer complex of the two polymers, wherein the resultant solution of the organic hydrocarbon liquid has a viscosity of at least about 10 cps, and furthermore exhibits shear thickening behavior. The component materials of the instant process generally include a water insoluble interpolymer complex in an organic hydrocarbon solvent system to form a solution with a concentration level of 0.01 to 10 weight percent.

A second aspect of the instant invention relates to the fact that the interpolymer complexes are more effective thickeners than the two individual component polymers.

A third aspect of the instant invention relates to the use of these interpolymer complexes in nonpolar hydrocarbon solvents as a shear thickening agent under increased shear conditions.

A fourth aspect of the instant invention relates to the observation that the thickening aspects of these interpolymer complexes can be markedly reduced or completely eliminated with the use of a suitable low molecular weight polar cosolvent.

In general, the interpolymer complex is formed from the interaction in solution of a water insoluble polymer containing carboxylic acid groups (polymer A) and a basic copolymer such as styrene/vinyl pryidine copolymer (polymer B).

The carboxylic acid containing a polymer of the instant invention is a copolymer containing an alpha-olefin and a vinyl alkylenecarboxylic acid having about 4 to about 20 carbon atoms, more preferably about 9 to about 18 and most preferably about 10 to about 16, wherein the resulting alkylenecarboxylic acid side groups are randomly distributed along the alpha-olefin backbone. The alpha-olefin has about 3 to about 27 carbon atoms, more preferably about 6 to about 25, and most preferably about 6 to about 18. The copolymer contains about 0.01 to about 5 mole % of the alkylenecarboxylic acid side groups more preferably about 0.05 to about 3 and most preferably about 0.1 to about 2. The number average molecular weight as measured by GPC of the alpha-olefin copolymer is about 10,000 to about 20,000,000, more preferably about 50,000 to about 15,000,000, and most preferably about 100,000 to about 10,000,000. The copolymer of the alpha-olefin and vinyl alkylenecarboxylic acid is formed by partially hydrolyzing with concentrated sulfuric acid or other suitable acids having a sufficiently low pH to effect hydrolysis, wherein the hydrolysis occurs in a solvent which is inert itself to hydrolysis such as an aliphatic or aromatic hydrocarbon. The copolymer of an alphaolefin and a vinyl alkylene ester is hydrolyzed partially according to the reaction scheme:

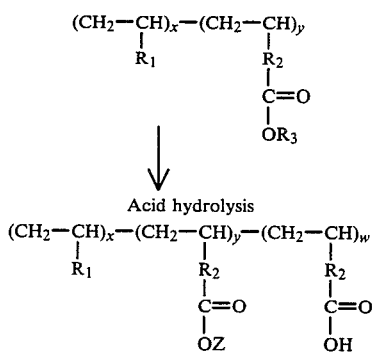

wherein Z is $R_3$ wherein $R_3$ is an alkyl group having about 1 to about 25 carbon atoms. $R_1$ is an alkyl group having about 1 to about 25 carbon atoms, $R_2$ is an alkylene group having about 3 to about 17 carbon atoms, x is about 99.99 to about 95.0 mole %, more preferably about 99.95 to about 97.0 and most preferably about 99.90 to about 98.0. The balance (y and w) comprises both carboxylic acid and ester containing units. Since the hydrolysis is only partial, wherein only a portion of the ester groups are hydrolyzed to carboxylic acid groups. The final hydrolyzed product is a mixture of ester and acid species, wherein the mixture contains about 0.1 to about 45 mole % of the acid species, more preferably about 2 to about 40, and most preferably about 4 to about 20.

It is evident that the copolymers covered within this invention encompass a broad class of hydrocarbon polymer systems. It is important that these hydrocarbon polymer backbones (in the absence of the acid groups) be soluble in the organic liquid, whose viscosity is to be controlled. To achieve the desired solubility, it is required that the polymer to be employed possess a degree of polarity consistent with that solvent. This solubility relationship can be readily established by anyone skilled in the art simply by appropriate texts (e.g., Polymer Handbook edited by Brandrup and Immergut, Interscience Publishers, 1967, section VI-341). In the absence of appropriate polymer-solvent compatibility knowledge, this can be determined experimentally by observing whether the selected polymer will be soluble in the solvent at a lever of ½ gram of polymer per 100 ml solvent. If the polymer is soluble, then this demonstrates that it is an appropriate backbone for modification with acid groups to achieve the objectives of this invention. It is also apparent that polymers which are too polar will not be soluble in the relatively nonpolar organic liquids of this invention. Therefore, only those polymer backbones (i.e., as measured in the absence of polar groups) having a solubility parameter less than 10.5 are suitable in this invention.

The basic nitrogen-containing copolymer such as styrene-vinyl pyridine copolymer (polymer B of the interacting polymer complex) can be formed by free radical copolymerization using techniques well-known in the polymer literature. Such polymers can be prepared by polymerizing by a variety of techniques a basic nitrogen-containing monomer such as vinyl pyridine with styrene, t-butyl styrene, alkyl acrylates, alkyl methacrylates, butadiene, isoprene vinyl chloride, acrylonitrile, butadiene/styrene monomer mixtures and copolymers, or more complex mixtures. An emulsion polymerization process is generally preferred, but other processes are also acceptable.

The amount of vinyl pryidine in the basic nitrogen-containing polymer can vary widely, but should range from less than 50 weight percent down to at least 0.5 weight percent.

Preferably, the amine content in the basic polymer is expressed in terms of basic nitrogen. In this respect, the nitrogen content in amides and similar nonbasic nitrogen functionally is not part of the interacting species.

The water insoluble base nitrogen-containing copolymer will comprise from about 0.5 to 50 weight percent basic groups situated along the chain backbone, or alternatively the basic groups content will range from 4 milliequivalents to about 500 milliequivalents per 100 g of polymer. The basic groups may be conveniently selected from the groups containing polymerizable primary, secondary and tertiary amine groups. Included in these categories are pyridine, anilines, pyrroles, and other basic polymerizable ammonia derivatives. Specific polymers include styrene-4-vinylpyridine, t-butyl styrene-4-vinylpyridine, ethylene-4-vinylpyridine copolymers, propylene-4-vinylpyridine copolymers, acrylonitrile-4-vinylpyridine, methyl methacrylate-4-vinylpyridine copolymers, block copolymers and ehtylene oxide/4-vinylpyridine, acrylic acid-4-vinylpyridine copolymers, ethylene-propylene 4-vinylpyridine terpolymers, isoprene-4-vinylpyridine, 4-vinylpyridine-elastomers copolymers and the like. The preferred base-containing polymers of the instant invention are styrene and 4-vinylpyridine and ethylene-propylene terpolymers with grafted 4-vinylpyridine. The former polymers are the preferred species.

These materials are prepared through conventional solution, suspension and emulsion copolymerization techniques.

The copolymer of styrene/vinyl pyridine is typically formed by the emulsion copolymerization of freshly distilled styrene and N-vinylpyridine monomers. This method of copolymerization is generally known to those well-versed in the art. As noted previously, solution or suspension techniques may also be used to prepare those base-containing polymeric materials.

The interpolymer complex of the copolymer of the alph-olefin and the alylenecarboxylic acid and the copolymer of styrene/vinyl pyridine is formed by forming a first solution of the copolymer of the alphaolefin and alkylene carboxylic acid in the previously described solvent system. A second solution of the copolymer of styrene/vinyl pyridine is formed by dissolving the copolymer of styrene/vinyl pyridine in an aromatic solvent such as xylene or benzene. Aternatively, both polymers can be dissolved simultaneously in the same solvent. The concentration of the copolymer of the alpha-olefin and alkylenecarboxylic acid in the solution is about 0.001 to about 5 g/dl, more preferably about 0.01 to about 4, and most preferably about 0.01 to about 1.5. The concentration of the copolymer of styrene/vinyl pyridine in the second solution is about 0.001 to about 5 g/dl, more preferably about 0.01 to about 4, and most preferably about 0.01 to about 1.5. The first solution of the copolymer of the alpha-olefin and alkylenecarboxylic acid and the second solution of the copolymer of styrene/vinyl pyridine are mixed together, thereby permitting the interaction of the copolymer of the alpha-olefin and alkylenecarboxylic acid and the copolymer of styrene/vinyl pyridine to form the water insoluble interpolymer complex. The molar ratio of the copolymer of the alpha-olefin alkylenecarboxylic acid to the copolymer of styrene/vinyl pyridine in the interpolymer complex is about 0.1 to about 20, more preferably about 0.5 to about 10, and most preferably about 1 to about 5. The concentration of the interpolymer complex in the hydrocarbon organic liquid is about 0.01 to about 10 weight percent, more preferably about 0.1 to about 7, and most preferably about 1.0 to about 5.

The amount of vinyl pyridine in the amine-containing polymer can vary widely, but should range from less than 50 weight percent down to at least 0.5 weight percent.

Preferably, the amine content in the basic polymer is expressed in terms of basic nitrogen. In this respect, the nitrogen content in amides and similar nonbasic nitrogen functionally is not part of the interacting species.

A minimum of three basic groups must be present on the average per polymer molecule and the basic nitrogen content generally will range from 4 meq. per 100 grams of polymer up to 500 meq. per 100 g. A range of 8 to 200 meq. per 100 is preferred.

The organic liquids, which may be utilized in the instant invention, are selected with relation to the ionic polymer and vice-versa. The organic liquid is selected from the group consisting of aromatic hydrocarbons, cyclic aliphatic ethers, aliphatic ethers, or organic aliphatic esters and mixtures thereof.

Specific examples of organic liquids to be employed with the various types of polymers are: benzene, toluene, ethyl benzene, methylethyl ketone, xylene, styrene, ethylenedichloride, methylene chloride, styrene, t-butyl styrene, aliphatic oils, aromatic oils, hexane, heptane, decane, nonane, pentane, aliphatic and aromatic solvents, oils such as Solvent "100 Neutral," "150 Neutral" and similar oils, diesel oil, octane, isooctane, aromatic solvents, ketone solvents, dioxane, halogenated aliphatics, e.g., methylene chloride, tetrahydrofuran.

The viscosity of organic hydrocarbon solution of the interpolymer complex having an increased viscosity can be reduced by the addition of a polar cosolvent, for example, a polar cosolvent in the mixture of organic liquid and water insoluble interpolymer complex to solubilize the pendant carboxylic acid groups. The polar cosolvent will have a solubility parameter of at least 10.0, more preferably at least 11.0 and is water miscible and may comprise from 0.1 to 15.0 weight percent, preferably 0.1 to 5.0 weight percent of the total mixture of organic liquid, water insoluble carboxylic acid copolymer, and polar cosolvent.

Normally, the polar cosolvent will be a liquid at room temperature; however, this is not a requirement. It is preferred, but not required, that the polar cosolvent be soluble or miscible with the organic liquid at the levels employed in this invention. The polar cosolvent is selected from the group consisting essentially of water soluble alcohols, amines, di- or trifunctional alcohols, amides, acetamides, phosphates, or lactones and mixtures thereof. Especially preferred polar cosolvents are aliphatic alcohols such as methanol, ethanol, n-propanol, isopropanol, 1, 2-propane diol, monoethyl ether of ethylene glycol, and n-ehtylformamide.

DETAILED DESCRIPTION OF THE PREFERRED EMBODIMENT

The following examples will demonstrate the performance of an interpolymer complex consisting of a polymer containing carboxylic acid side groups and a styrene-4-vinylpyridine in several specific nonpolar hydrocarbon solvent environments.

EXAMPLE 1

Synthesis of Polymer (A) Having Alkylenecarboxylic Acid Side Chains (a) Copolymerization of 1-Octene and Methyl-10-undecenoate A 2-liter flask was charged with a mixture of n-heptane (480 ml), 1-octene (500 ml), methyl-10-undecenoate (6.4 g), and diethyl aluminum chloride (72 mmole), and heated to 60° C.

The catalyst containing $TiCl_3$ (described in U.S. Pat. No. 4,240,928) (2.0 g) was then added with n-heptane (20 ml). After stirring for 1 hour, the reaction was terminated with a small amount of isopropyl alcohol.

The polymer was precipitated and washed with isopropyl alcohol and vacuum dried at 60° C. to yield 87.9 g of colorless material. IR spectrum showed that the copolymer contained 0.8 mole % of methyl-10-undecanoate unit. Intrinsic viscosity was about 4.3 dl/g in a decalin solution. $\overline{Mn}$ was $4.6 \times 10^6$ by means of GPC.

(b) Hydrolysis of 1-octene-methyl-1-undecenoate copolymer—Polymer A 1-octene methyl-10-undecenoate copolymer similar to the one described in (a) above was converted to a respective copolymer having alkylenecarboxylic acid side chains as described below.

A solution of the copolymer (10 g) in xylene (500 g) was placed in a 2-liter flask and heated to 40° C. Concentrated sulfuric acid (20 ml) was then added. After stirring for one hour, the reaction mixture was cooled down and washed with a mixture of water and isopropyl alcohol three times.

A white product was finally obtained by precipitating from the solution with isopropyl alcohol. Further purification by reprecipitation and drying in a vacuum oven at 50° C. gave 8.0 g of colorless rubbery polymer (polymer A).

EXAMPLE 2

Synthesis of Styrene-Vinylpyridine Copolymer—Polymer B

A representative example for the synthsis of styrene-4-vinylpyridine copolymer (SVP) is outlined below.

Into a 1-liter 4-neck flask the following ingredients were introduced:
- 100 g distilled styrene
- 6.4 g sodium lauryl sulfate
- 240 ml. distilled water
- 0.4 g potassium persulfate
- 9.4 g 4-vinylpyridine The solution was purged with nitrogen gas for 1 minutes to remove dissolved oxygen. As the nitrogen gas purge began, the solution was heated to 55° C. After 24 hours, the polymer was precipitated from solution with methanol. Subsequently, the resulting polymer was washed several times with a large excess of methanol and dried in a vacuum oven at 60° C. for 24 hours. Elemental analysis showed a nitrogen content of 1.13 weight percent which corresponds to 8.4 mole percent 4-vinyl-pyridine.

EXAMPLE 3

Viscosification by Network Formation

Polymer A of Example 1 having acid functionalities and polymer B of Example 2 having base functionalities were separately dissolved in xylene at 1 weight percent concentration. Various mixtures of these two solutions were prepared in order to form polymer networks in solution via acid-base interactions.

Polymer A of Example 1 has a 1-octene backbone with $-(CH_2)_8-COOH$ alkyl carboxylic acid groups randomly attached along the backbone. The carboxylic level is on the order of 0.1–0.5 mole percent. The average molecular weight is about 2 million based on an intrinsic viscosity in xylene of about 3.5.

Polymer B of Example 2 is a copolymer of styrene and vinyl pyridine with a pyridine level of about 8 mole percent and a viscosity average molecular weight of about 2 million.

Mixtures of the xylene solutions at 1 weight percent each were blended, and the resulting solution viscosities at 25° C. and 30 sec$^{-1}$ are shown in Table 1.

TABLE 1

Viscosities of Acid-Base Network Solutions in Xylene at 1 Weight Percent Polymer

| Composition | | Viscosity |
| Polymer A Parts | Polymer B Parts | cP at 25° C. and 30 sec$^{-1}$ |
| --- | --- | --- |
| 100 | 0 | 171 |
| 97.5 | 2.5 | 571 |
| 95 | 5 | 879 |
| 90 | 10 | 358 |
| 0 | 100 | 8.5 |

The mixture viscosities increased significantly over the viscosities of the individual components and peaked at a ratio of about 95/5 by weight for polymer A to polymer B. The peak ratio is approximately at a stoichiometric concentration of acid to base functionalities.

This example shows that polymers A and B can interact to increase solution viscosity, as would be expected from increasing molecular weight. It suggests, therefore, that larger structures are formed as a result of the interactions.

EXAMPLE 4

Shear Thickening

The solution blends described in Example 3 were measured with respect to their viscosity-shear rate behavior in a Haake CV-100 viscometer at 25° C. All the blends showed increased viscosities at higher shear rates (i.e., dilatant behavior).

A specific example is the blend of 90/10 of polymer A/polymer B from Example 3 at a total concentration of 1 weight percent in xylene. Viscosities for this blend were measured with shear rates of up to 60 sec$^{-1}$ with the following results:

| Shear Rate (sec$^{-1}$) | Viscosity (cP) |
| --- | --- |
| 3 | 248 |
| 15 | 284 |
| 30 | 358 |
| 60 | 427 |

This example shows that hydrocarbon solutions of networks made of acid-base interacting polymers may exhibit significant shear thickening or dilatant behavior.

EXAMPLE 5

Destruction of a Network in Solution

A network of acid-base interacting polymers in solution was prepared by blending solutions of two polymers at 0.5 weight percent concentration in xylene each.

One polymer, polymer C is similar to polymer A of Example 1, the only difference being the level of carboxylic acid which was on the order of 0.3–1.0 mole percent. The other polymer was polymer B of Example 3.

The two solutions were mixed at a ratio of 97.5 parts of polymer C to 2.5 parts of polymer B. The resulting viscosity was about 400 cP at 25° C. and 20 sec$^{-1}$. Upon addition of 1 weight percent methanol to this polymer network solution the viscosity dropped to about 2.4 cP at 25° C. and 20 sec$^{-1}$ and shear thickening was eliminated.

This example shows that a network of acid-base interacting polymers in solution can be effectively and selectively destroyed by the addition of a proper agent such as methanol, at relatively low concentration. This is useful in reversing viscosification or antimisting properties which are introduced by acid-base interactions.

What is claimed is:

1. A process for forming a shear thickening or a organic liquid having a viscosity of at least about 10 CPS which includes the steps of:

(a) forming a first solution of an organic hydrocarbon liquid and a copolymer of an alpha-olefin and a vinyl alkylenecarboxylic acid having an acid content of from about 0.01 to 10 mole percent, wherein said copolymer of said alpha-olefin and said vinyl alkylenecarboxylic acid has the formula:

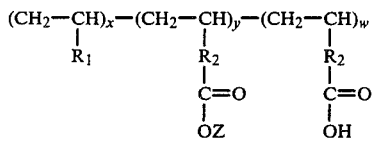

wherein Z is $R_3$, $R_1$ is an alkyl group having about 1 to about 25 carbon atoms, $R_2$ is an alkylene group having about 3 to about 17 carbon atoms, $R_3$ is an alkyl group having about 1 to about 25 carbon atoms, x is about 99.99 to about 95.0 mole %, more preferably about 99.95 to about 97.0 and most preferably about 99.90 to about 98.0 and y plus w is about 0.01 to about 5.0 mole %, wherein said polymer must contain both acid and ester species;

(b) forming a second solution of an organic hydrocarbon liquid and an amine containing polymer which contains basic nitrogen atoms wherein the basic nitrogen content ranges from about 4 to about 500 milliequivalents per 100 gms. of polymer, said amine containing polymer being a copolymer formed from a first monomer and a second monomer, said first monomer being selected from the group consisting of styrene, t-butyl styrene, alkylacrylates, alkylmethacrylates, vinyl chloride, isoprene, butadiene, acrylonitrile and butadiene/styrene and said second monomer being selected from the group consisting of pyridine, anilines and pyrroles; and (c) mixing said first and said second solutions to form an organic hydrocarbon liquid having an interpolymer complex of said neutralized copolymer of an alph-olefin and a vinyl alkylenecarboxylic acid and said amine containing polymer therein, wherein said complex is present at a level of from 0.01% to about 10% and the viscosity of said solution increases by at least 10% as shear rate increases.

2. A process according to claim 1 wherein said organic liquid is selected from the group consisting of aromatic hydrocarbons, aliphatic hydrocarbons and mixtures thereof.

3. A process according to claim 1 wherein said organic liquid is selected from the group consisting of aliphatic hydrocarbons and aromatic hydrocarbons.

4. A process according to claim 1 wherein said organic liquid is selected from the group consisting of benzene, toluene, ethyl benzene, xylene, and styrene and mixtures thereof.

5. A process according to claim 1 wherein said basic polymer is a copolymer of styrene/vinyl pyridine.

6. A process according to claim 1 wherein said styrene-4 vinylpyridine copolymer has about 0.1 to 50 mole percent 4 vinylpyridine units.

7. A process according to claim 1, wherein said base-containing polymer is selected from the group containing primary, secondary and tertiary amine units.

8. A process according to claim 1 wherein said interpolymer complex possesses shear thickening characteristics.

9. A process according to claim 1, wherein said interpolymer complex thickening characteristics are modulated or totally eliminated by a polar cosolvent.

10. A process according to claim 9 wherein said polar cosolvent has a greater polarity than said organic liquid.

11. A process according to claim 10 wherein said polar cosolvent is selected from the group consisting of aliphatic alcohols, aliphatic amines, di- or tri-functional aliphatic alcohols, water miscible amide, acetamides, phosphates, and lactones and mixtures thereof.

12. A process according to claim 10 wherein said polar cosolvent is selected from the group consisting of methanol, ethanol, propanol, isopropanol and mixtures thereof.

13. A process according to claim 10 wherein said polar cosolvent has a solubility parameter of at least about 10 and is water miscible.

14. A process according to claim 1 wherein said polymers are codissolved in said organic hydrocarbon liquid.

15. A solution which comprises:
(a) an organic liquid; and
(b) about 0.01 to about 10 weight percent of an interpolymer complex of:
(1) a copolymer of styrene/vinyl pyridine; and
(2) a copolymer of an alpha-olefin and a vinyl alkylene carboxylic acid having the formula:

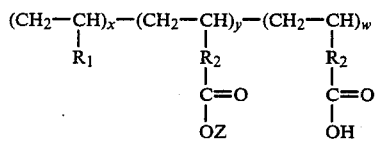

wherein Z is R, $R_1$ is an alkyl group having about 1 to about 25 carbon atoms, $R_2$ is an alkylene group having about 3 to about 17 carbon atoms, R is an alkyl group having about 1 to about 25 carbon atoms, x is about 99.99 to about 95.0 mole %, wherein y plus w is about 0.01 to about 5.0 mole percent, wherein said polymer must contain both acid and ester species.

* * * * *